April 10, 1945.   D. ROSEGARD   2,373,417
FISH LURE
Filed March 13, 1944
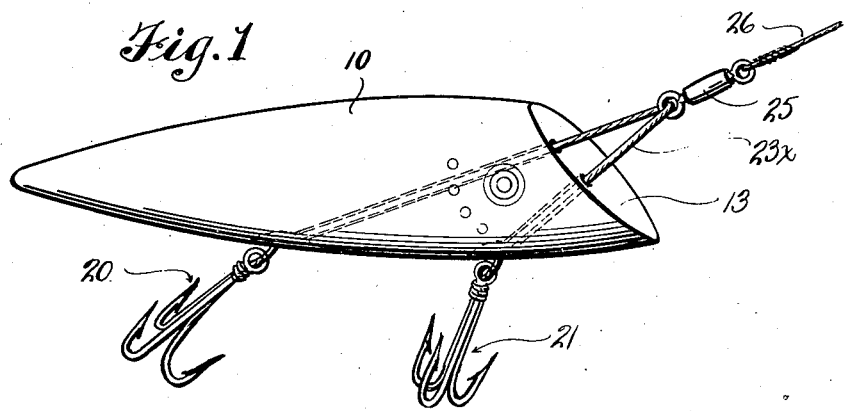
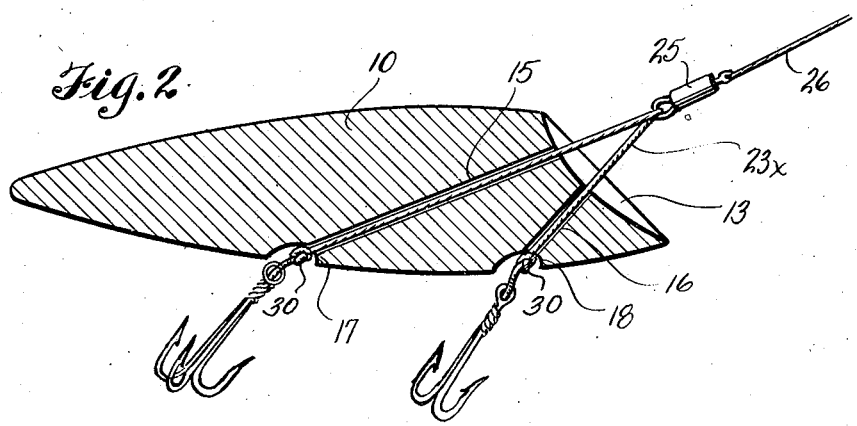
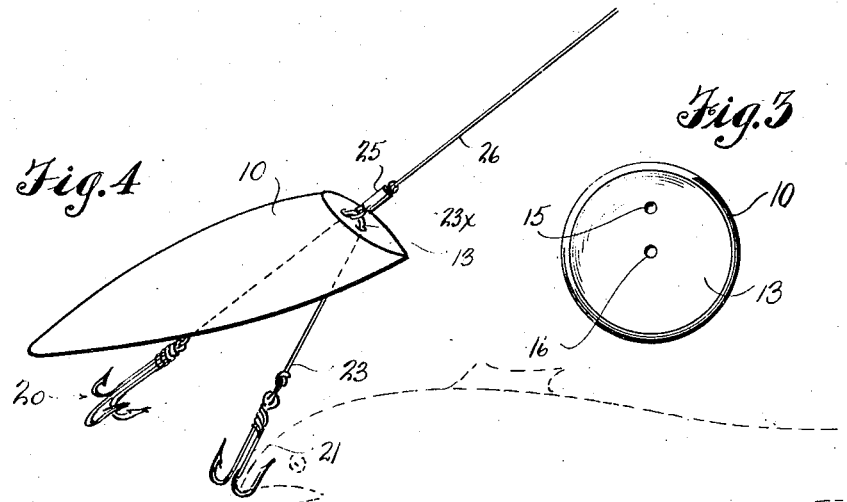
INVENTOR
DORA ROSEGARD
BY
Cook & Robinson
ATTORNEYS Patented Apr. 10, 1945

2,373,417

UNITED STATES PATENT OFFICE 2,373,417

FISH LURE

Dora Rosegard, Seattle, Wash.

Application March 13, 1944, Serial No. 526,190

5 Claims. (Cl. 43—46)

This invention relates to improvements in fish lures and it has reference, more particularly, to that type of fish lure that is commonly known as a "plug," and which, in use, is attached to a line and has fish hooks suspended therefrom.

It is the principal object of this invention to provide novel improvements in the manner and means of applying the hooks to the plug so as to prevent their fouling one another. Furthermore, to provide improvements in the connection that result in the automatic separation of the hook or sets of hooks whenever a fish is caught by any one of them, thus to prevent the hooks from becoming snared on each other, or the caught fish from becoming gouged or torn by hooks other than that by which it has been caught.

It is also an object of this invention to provide a form of attachment of hooks that is more practical, less expensive, easier to assemble with the line and plug and a more direct means for connecting the hooks to a line in a manner thereby to place the strain directly on the connections with the line rather than through connections attached to the plug body.

Other objects of the invention reside in the details of construction of parts, in their combination, relationship and mode of use as will hereinafter be fully described.

In accomplishing these and other objects of the invention, I have provided the improved details of construction, the preferred forms of which are illustrated in the accompanying drawing, wherein—

Fig. 1 is a perspective view of a plug embodying improvements in accordance with the objects of the present invention.

Fig. 2 is a longitudinal section of the plug showing the two sets of hooks and their connecting cord as applied to the plug channels.

Fig. 3 is a view of the forward end of the plug.

Fig. 4 is a view illustrating the separation of the sets of hooks incident to a fish being caught by hooks of either set.

Referring more in detail to the drawing—

The plug body is here designated, in its entirety, by reference numeral 10. Preferably it would be made of wood, but could be of any other similar or suitable material, and it consists of an elongated piece of the selected material tapered from near its forward end rearwardly and terminating in a rounded point. The plug body is of greatest diameter about one-third the distance back from its forward end and its shape is what might be referred to as a "cigar shape." At any location between its front and rear ends, the plug body is circular in cross section, as will be understood by reference to Fig. 4. The forward end of the plug is cut on a bevel which forms an angle of approximately 50° with reference to the axial line of the body and the slope of the plane of this bevel is downwardly and forwardly from the top edge of the plug toward the bottom edge to cause its downward deflection when drawn through the water. The entire forward end surface of the plug is dished or concaved to form the depression designated at 13; this depression being of substantial depth as will be understood by reference to Fig. 2.

Formed in the central longitudinal vertical plane of the plug are two separate channels, 15 and 16, which open at their forward ends into the dished portion of the forward end surface of the plug and, at their rearward ends, open to the under side of the plug. These passages are spaced apart and diverge so that the forward end of the lower passage 16 opens to the face of the plug at about the center thereof and the upper channel 15 opens to the face of the plug about midway between the center and the top edge. The lower end of the lower channel 16 opens to the under side of the plug about one-third of the distance from the forward to the rearward end, while the upper channel opens about two-thirds of the way back from forward to rearward end. At their lower ends, the channels open into counterbored or recessed sockets designated at 17 and 18.

In the present instance, the two sets of hooks which are designated respectively at 20 and 21 are connected to opposite ends of a cord 23. The cord extends from one set of hooks through the channel 16 then is looped back and passes through the channel 15 and attaches to the second group of hooks. A loop 23x is thus formed forwardly of the forward end surface of the body and this loop has a sliding ring and swivel fitting 25 applied thereto and a fish line 26 is attached to the swivel.

It is to be explained that the cord is freely contained in the channels and can run in either direction to the extent permitted by the hooks attached to its ends.

In normal use of the plug, for example, when it is being drawn through the water by the line 26, both sets of hooks are drawn up against the plug body and the loop end of the hook connecting cord extends substantially forward of the forward end of the plug. In the event that a fish strikes either set of hooks and is caught thereon, the cord will slide endwise in the channels and that end on which the fish is caught will be drawn out, as has been indicated in dotted lines in Fig. 2, or as illustrated in Fig. 3, and when so drawn out, it places the sets of hooks apart and draws one in close to the plug body, thus the fish will not become snared, torn or gouged by that group of hooks.

The particular manner of attaching the ends of the connecting cord 23 to the two sets of hooks is of no particular significance so long as it is secure. Neither is it of any importance as to the number of hooks in each set insofar as the objects of the present invention are concerned. However, it is desirable that the cord be formed at each end with a knot, as at 30, near its connection with the hooks so that the knots will engage with the bases of the counterbored sockets when the line is under strain, and the hooks will be in the clear.

Furthermore, the extent of the loop 23x forwardly of the plug may be altered or determined in accordance with the character of the hooks being used, the character of the plug or the desires of the individual using the plug.

It is important that the cord 23 run freely in the channels and that the connection of the line with the loop 23x be of a free reeving character, so that there will be no hindrance to the intended functioning of the parts.

This form of connection is practical from the standpoint that it eliminates all fastenings for hooks on the plug body and places the strain of a strike directly on the line.

Having thus described my invention, what I claim as new therein and desire to secure by Letters Patent is—

1. A fish lure comprising a plug body formed with channels therein leading from the forward end portion of the body and opening, in spaced relationship, to the under side thereof; a cord forming a loop extended forwardly from the plug and with its two end portions freely passing through the said channels to the under side of the plug body, fish hooks attached to the cord ends and a fish line having sliding connection with the loop.

2. A fish lure comprising a plug body formed with a forwardly facing end surface and with channels leading from said surface through the plug body and opening to the under side thereof in spaced relationship, a cord doubled back upon itself to form a loop extended beyond the forward end of the plug, with the two end portions of the cord passing freely through said plug channels to the under side of the plug, fish hooks attached to said cord ends, and limiting its run in the channels, a fish line and a sliding ring connection between the line and the said loop of the cord.

3. A lure as recited in claim 2 wherein the said channels open to the under side of the plug at substantially spaced locations in the longitudinal direction of the plug.

4. A lure as recited in claim 2 wherein the said channels open to the under side of the plug at substantially spaced locations in the longitudinal direction of the plug body, and wherein the said cord is of such length that when drawn to one extreme of travel by a fish snared on the hook at that end, the fish will be beyond the hooks at the other end of the cord.

5. A fish lure comprising an elongated plug body formed with a forwardly facing end surface and having two channels formed therein that open at their forward ends to the said end surface and at their lower ends to the under side of the body at locations that are substantially spaced, and which channels are counterbored at their lower ends, a cord doubled back on itself and formed in a loop forwardly of the plug and having the two end portions extended through said channels to the under side of the plug and freely slidable in said channels, and a set of hooks fixed to each end of the cord, a swivel having an end ring applied to the loop of the cord and freely slidable thereon and a fish line attached to the swivel.

DORA ROSEGARD.